United States Patent
Na et al.

(10) Patent No.: US 12,026,180 B2
(45) Date of Patent: Jul. 2, 2024

(54) CLUSTERING DATA DESCRIBING INTERACTIONS PERFORMED AFTER RECEIPT OF A QUERY BASED ON SIMILARITY BETWEEN EMBEDDINGS FOR DIFFERENT QUERIES

(71) Applicant: Maplebear Inc., San Francisco, CA (US)

(72) Inventors: Taesik Na, Issaquah, WA (US); Tejaswi Tenneti, Fremont, CA (US); Haixun Wang, Palo Alto, CA (US); Xiao Xiao, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/736,716

(22) Filed: May 4, 2022

(65) Prior Publication Data

US 2023/0252049 A1    Aug. 10, 2023

Related U.S. Application Data

(60) Provisional application No. 63/308,001, filed on Feb. 8, 2022.

(51) Int. Cl.
  *G06F 16/28* (2019.01)
  *G06F 16/2457* (2019.01)
  *G06F 16/248* (2019.01)
  *G06F 18/2413* (2023.01)

(52) U.S. Cl.
  CPC ...... *G06F 16/285* (2019.01); *G06F 16/24573* (2019.01); *G06F 16/24575* (2019.01); *G06F 16/248* (2019.01); *G06F 18/24147* (2023.01)

(58) Field of Classification Search
  CPC ............. G06F 16/285; G06F 16/24573; G06F 16/24575; G06F 16/248; G06F 18/24147
  USPC ......................... 707/736, 737, 738, 740, 741
  See application file for complete search history.

(56) References Cited

U.S. PATENT DOCUMENTS

| | | | |
|---|---|---|---|
| 2002/0078045 A1* | 6/2002 | Dutta | G06F 16/334 |
| | | | 707/999.007 |
| 2006/0117002 A1 | 6/2006 | Swen | |
| 2008/0010259 A1 | 1/2008 | Feng et al. | |
| 2008/0120292 A1 | 5/2008 | Sundaresan et al. | |
| 2012/0016877 A1 | 1/2012 | Vadrevu et al. | |

(Continued)

OTHER PUBLICATIONS

PCT International Search Report and Written Opinion, PCT Application No. PCT/US2023/10525, dated Apr. 13, 2023, 9 pages.

*Primary Examiner* — Phong H Nguyen
(74) *Attorney, Agent, or Firm* — Fenwick & West LLP

(57) ABSTRACT

An online system leverages stored interactions with items made by users after the online system received queries to determine display of items satisfying the query. For example, the online system trains a model to predict a likelihood of a user performing an interaction with an item displayed after a query was received. As different items receive different amounts of interaction from users, limited historical interaction with certain items may limit accuracy of the model. The online system generates embeddings for previously received queries and uses measures of similarity between embeddings for queries to generate clusters of queries. Previous interactions with queries in a cluster are combined, with the combined data being used for determining display of items in response to a query.

19 Claims, 6 Drawing Sheets

(56) References Cited

U.S. PATENT DOCUMENTS

| | | |
|---|---|---|
| 2013/0073400 A1 | 3/2013 | Heath |
| 2019/0179917 A1* | 6/2019 | Agrawal ............. G06F 16/9537 |
| 2021/0287271 A1* | 9/2021 | Prasad ............... G06Q 30/0625 |
| 2021/0406260 A1* | 12/2021 | Sharifi ................. G06F 18/214 |
| 2022/0358559 A1* | 11/2022 | Liu ..................... G06F 16/9538 |
| 2023/0011128 A1* | 1/2023 | Furlan ............... G06F 16/24545 |
| 2023/0074406 A1* | 3/2023 | Baeuml ................ G10L 15/183 |

* cited by examiner

CLUSTERING DATA DESCRIBING INTERACTIONS PERFORMED AFTER RECEIPT OF A QUERY BASED ON SIMILARITY BETWEEN EMBEDDINGS FOR DIFFERENT QUERIES

CROSS-REFERENCE TO RELATED APPLICATIONS

This application claims the benefit of U.S. Provisional Application No. 63/308,001, filed Feb. 8, 2022, which is incorporated by reference in its entirety.

BACKGROUND

This disclosure relates generally to analyzing interactions with items after a query is received, and more specifically to combining data describing interactions with items after receipt of different queries based on measures of similarity between queries.

In current online concierge systems, shoppers (or "pickers") fulfill orders at a physical warehouse, such as a retailer, on behalf of users as part of an online shopping concierge service. An online concierge system provides an interface to a user identifying items offered by a physical warehouse and receives selections of one or more items for an order from the user. In current online concierge systems, the shoppers may be sent to various warehouses with instructions to fulfill orders for items, and the shoppers then find the items included in a user's order in a warehouse and deliver the items included in the order to a location specified by the user.

When creating an order for fulfillment by an online concierge system, users often provide queries including one or more terms to the online concierge system. Items having attributes that at least partially match a query are displayed to a user, who performs one or more interactions with the displayed items. For example, a user selects an item displayed in response to a query in an order. In other examples, a user stores an item displayed in response to a query for subsequent retrieval or requests additional information from the online concierge system for an item displayed in response to a query.

An online system stores information describing received queries, with the stored information for a query identifying interactions by users with items displayed in response to the query. Conventional online concierge systems maintain information for different queries that describe interactions performed after a query was received, and such systems may leverage those interactions for determining how to subsequently display results for the query. However, different amounts of interactions by users are received for different queries, so a conventional online concierge system has different amounts of interactions stored in association with different queries. Such varying data for interactions received after different queries limits a conventional online concierge system's ability to refine results displayed for queries having previously received limited amounts of interaction by users.

SUMMARY

An online system, such as an online concierge system, receives queries from users for items for inclusion in orders. Each query includes one or more terms. In response to receiving a query, the online system retrieves items having information that at least partially matches the query and displays the items. To improve item retrieval over time, the online system stores a received query in association with the items displayed in response to the query and information describing one or more interactions made by users with respect to the displayed items. For example, the online system stores a received query, identifiers of items displayed in response to the query, and indications of a number of times a specific interaction was performed with an item displayed in response to the query (e.g., a number of times an item displayed in response to the query was included in an order). In some embodiments, the online system stores a received query, identifiers of items displayed in response to the query, and a frequency with which a specific interaction was performed with each item displayed in response to the query, with the frequency determined as a ratio of a number of occurrences of the specific interaction with the item to a number of times the item was displayed in response to the query.

However, different queries received by the online system may have similar semantic meanings despite including different terms or having terms in different orders. The online system leverages measures of similarity between different stored queries to increase an amount of stored data describing interaction with a query by combining stored data describing interactions with queries having at least a threshold measure of similarity to each other. To determine a measure of similarity between stored queries, the online system generates an embedding for each stored query. Example models for generating an embedding for a stored query include a next token prediction model, a masked language model, a next sentence prediction model, a permutation language model, and a replaced token detection model; however, other models may be applied to a suggestion to generate an embedding for the stored query. The embedding for a stored query represents the stored query in a latent space. In various embodiments, the online system generates an embedding for each stored query and stores an association between a stored query and the embedding for the stored query.

The online system selects a stored query and determines measures of similarity between the embedding for the stored query and embeddings for additional stored queries. Based on the measures of similarity, the online system identifies additional stored queries having at least a threshold measure of similarity with the selected stored query. In some embodiments, the measure of similarity between the embedding for the stored query and an additional stored query is a distance between the embedding for the stored query and the embedding for the additional stored query. In the preceding example, the online system identifies additional stored queries with embeddings within a threshold distance of the embedding for the stored query in the latent space. The online system may identify the additional stored queries using one or more nearest neighbor methods or approximate nearest neighbor methods. The online system generates a cluster including the selected stored query and the additional stored queries with embeddings within the threshold distance from the embedding of the selected stored query in the latent space.

In other embodiments, the online system determines a measure of similarity between the embedding for the stored query and an additional stored embedding as a dot product or a cosine similarity between the embedding for the stored query and an additional stored embedding. The online system identifies additional stored queries with embeddings having at least the threshold measure of similarity to the embedding for the selected stored query and generates one or more clusters including the stored query and the identified additional stored queries. In some embodiments, the online system uses K-means clustering to generate clusters of stored queries based on embeddings for the stored queries. Using K-means clustering causes a stored query to be clustered based on the distance of the embedding of the stored query to a characteristic embedding for a cluster.

For a cluster of stored queries, the online system retrieves the stored information for each stored query describing interactions performed by users after the stored query was received and combines the information stored for each stored query of the cluster. The combined information is associated with cluster identifier uniquely identifying the cluster. As the cluster of stored queries includes stored queries with embeddings having at least the threshold measure of similarity, the stored queries in a cluster are semantically similar to each other. This allows the online system to leverage that semantic similarity to increase an amount of stored information for the stored queries of the cluster by combining the stored information for each stored query of the cluster and associating the combined information with a cluster identifier uniquely identifying the cluster. In various embodiments, a stored query within the cluster is stored in association with the cluster as a representative stored query for the cluster.

The online system generates one or more metrics for the cluster from the combined stored information, such as a metric for different products displayed in results for stored queries of the cluster. For example, a metric for the representative stored query may be a ratio of a number of times a specific interaction was performed with a product after a stored query of the cluster was received to a number of times the product was displayed in results for stored queries of the cluster. In some embodiments, the online system determines a ratio of a sum of a number of times the specific interaction was performed with the product across stored queries of the cluster during a time interval and a sum of a number of times the product was displayed in results of stored queries of the cluster during the time interval. In other embodiments, the online system determines one or more other metrics. The one or more metrics are stored in association with each stored query of the cluster in some embodiments or are stored in association with the representative stored query of the cluster. In various embodiments, the online concierge system modifies a position of a product in an interface or in results for a stored query within the cluster based on a metric determined for the product from the combined stored information associated with the cluster.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Architecture

Figure 1:
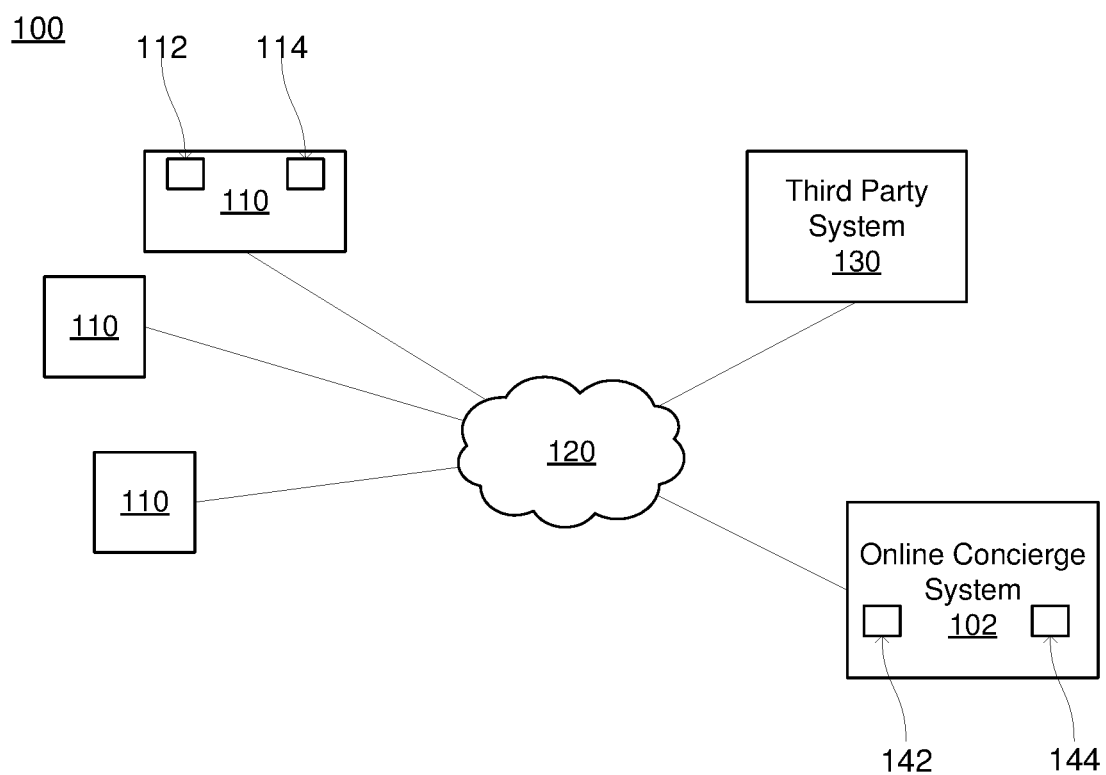
FIG. 1 is a block diagram of a system environment in which an online system, such an online concierge system, operates, according to one embodiment.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described below in conjunction with FIGS. 2, 5 and 6. For example, the memory 144 has instructions encoded thereon that, when executed by the processor 142, cause the processor 142 to generate embeddings for queries stored by the online concierge system 102 and to generate one or more clusters of stored queries based on measures of similarity between embeddings for different stored queries, as further described below in conjunction with FIGS. 5 and 6. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-6, and may include specific computing components such as processors, memories, communication interfaces, and/or the like.

System Overview

Figure 2:
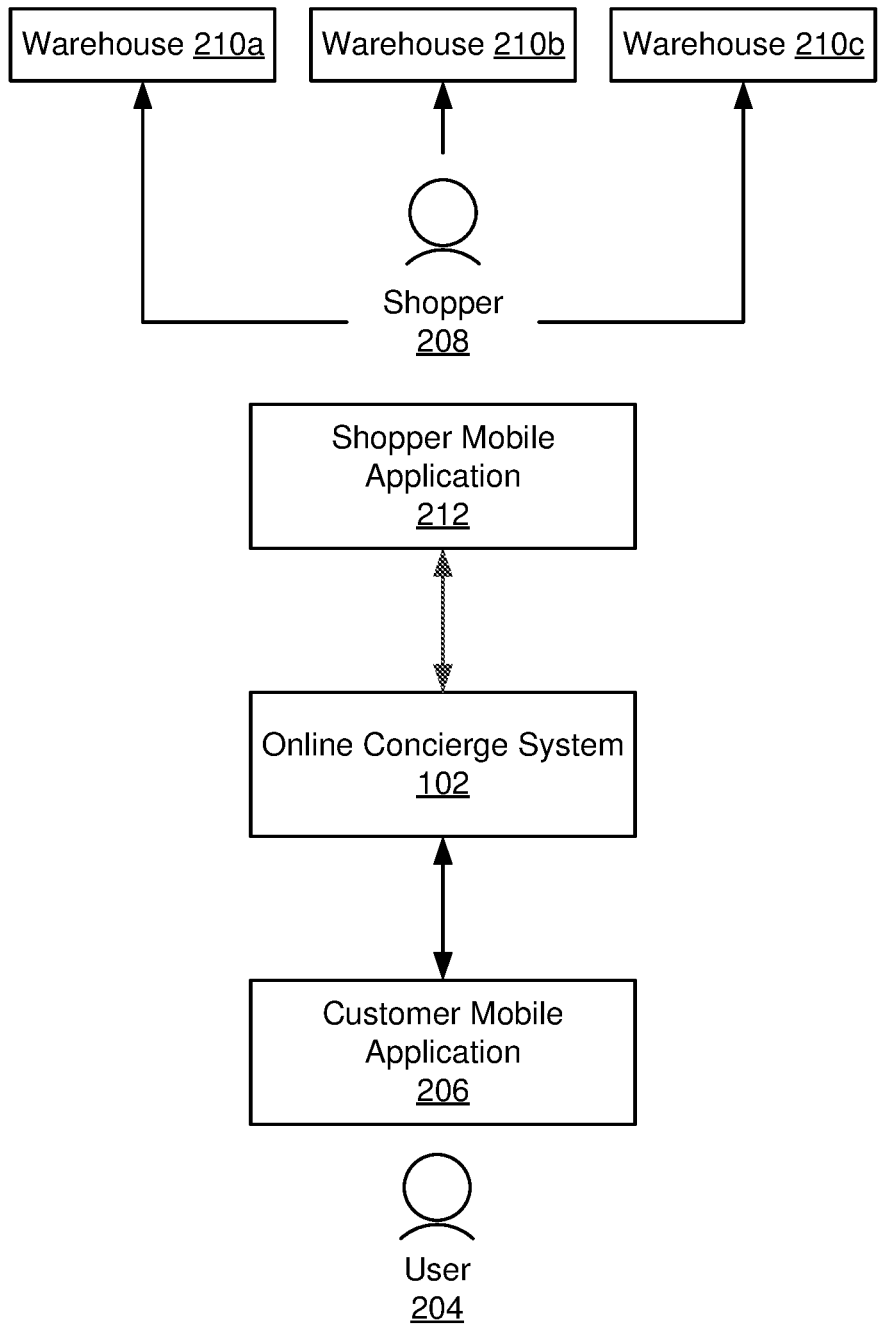
FIG. 2 illustrates an environment of an online shopping concierge service, according to one embodiment.

FIG. 2 illustrates an environment 200 of an online platform, such as an online concierge system 102, according to one embodiment. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 202. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
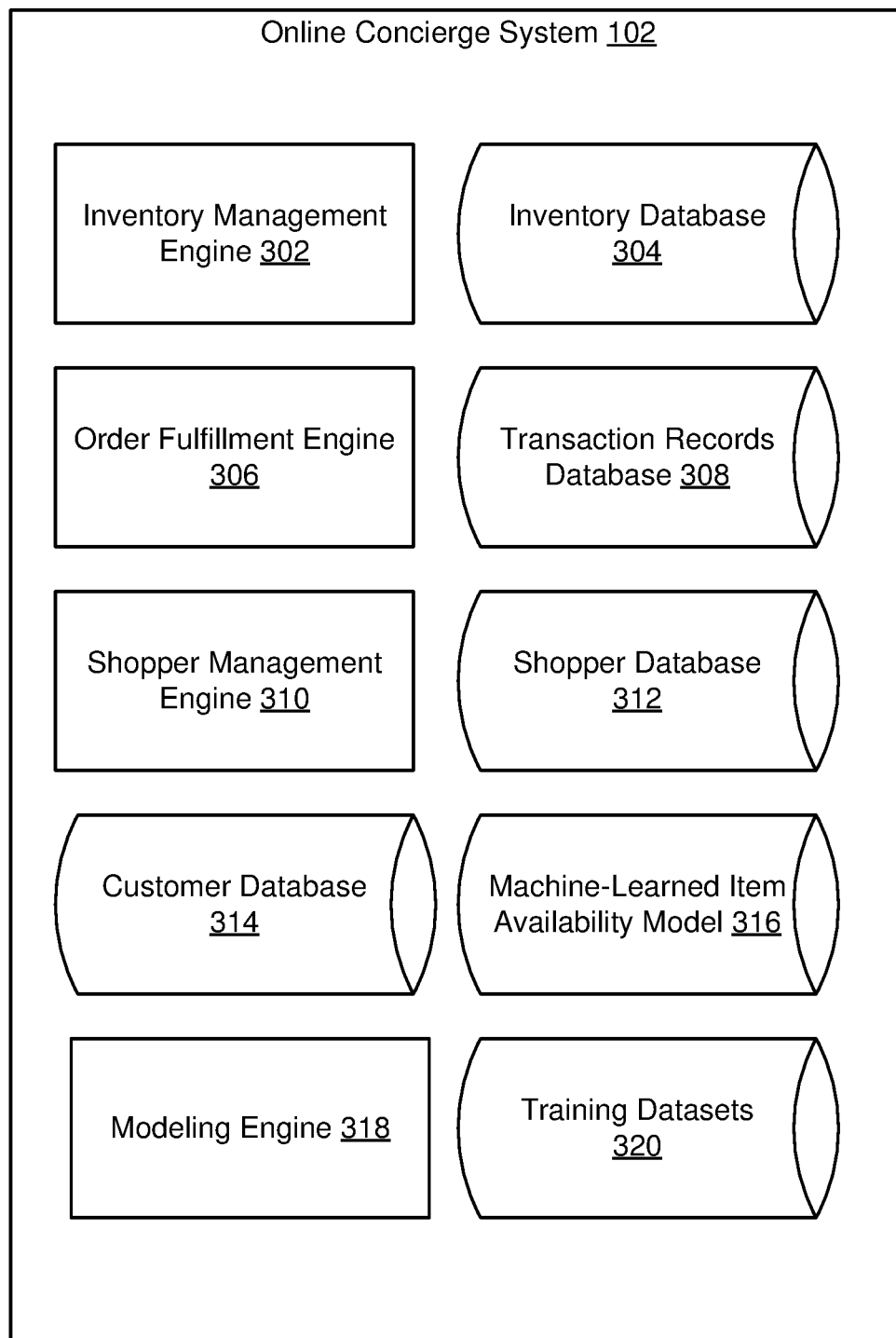
FIG. 3 is a diagram of an online shopping concierge system, according to one embodiment.

FIG. 3 is a diagram of an online concierge system 102, according to one embodiment. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item, if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 202 determines a taxonomy of items offered by the warehouse 210. Different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., lower levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 stores previously received queries and information describing interactions by users with items included in displayed results for the query. Based on the interactions by users with products in results for the query, the order fulfillment engine 306 may modify presentation or ordering of items in results for the query to increase user interaction with the results for the query. As further described below in conjunction with FIGS. 5 and 6, to improve analysis of user interactions with infrequently received queries or with queries for which the online concierge system 102 has received limited interactions with results, the order fulfillment engine 206 generates or obtains an embedding for each stored query. The order fulfillment engine 206 selects a stored query and determines measures of similarity between an embedding for the stored query and embeddings for additional stored queries. Based on the measures of similarity, the order fulfillment engine 306 generates a cluster including the selected stored query and one or more additional stored queries. The order fulfillment engine 306 combines interactions by users with results for each stored query in the cluster. The combined interactions are stored in association with a cluster identifier of the cluster, and the order fulfillment engine 306 uses the combined interactions to analyze or to evaluate each stored query included in the cluster, as further described below in conjunction with FIG. 5.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine e10 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfilment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212.

Machine Learning Models

The online concierge system 102 further includes a machine-learned item availability model 316, a modeling engine 318, and training datasets 320. The modeling engine 318 uses the training datasets 320 to generate the machine-learned item availability model 316. The machine-learned item availability model 316 can learn from the training datasets 320, rather than follow only explicitly programmed instructions. The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The item probability generated by the machine-learned item availability model 316 may be used to determine instructions delivered to the user 204 and/or shopper 208, as described in further detail below.

The training datasets 320 relate a variety of different factors to known item availabilities from the outcomes of previous delivery orders (e.g., if an item was previously found or previously unavailable). The training datasets 320 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 include factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
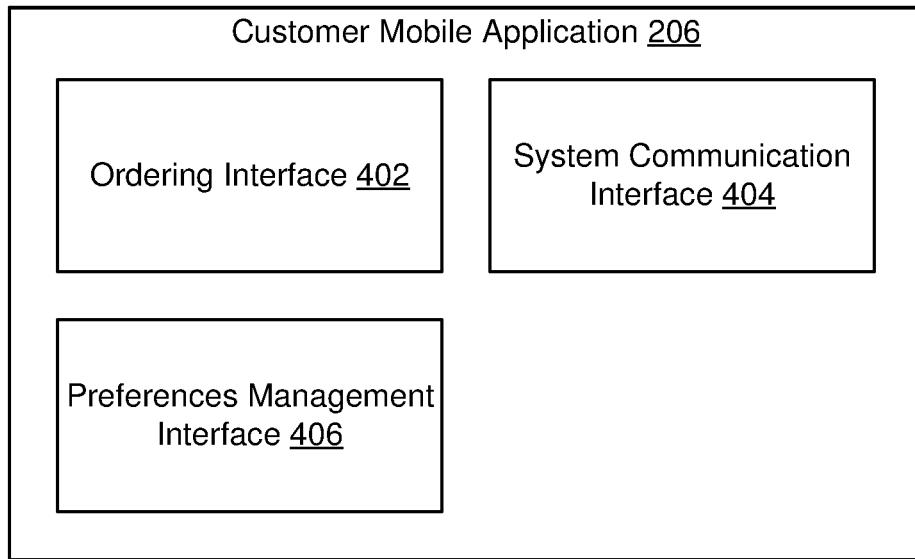
FIG. 4A is a diagram of a customer mobile application (CMA), according to one embodiment.

FIG. 4A is a diagram of the customer mobile application (CMA) 206, according to one embodiment. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 202. The CMA 206 also includes a preferences management interface 406 which allows the user 104 to manage basic information associated with his/her account, such as his/her home address and payment instruments. The preferences management interface 406 may also allow the user to manage other details such as his/her favorite or preferred warehouses 210, preferred delivery times, special instructions for delivery, and so on.

Shopper Mobile Application

Figure 4B:
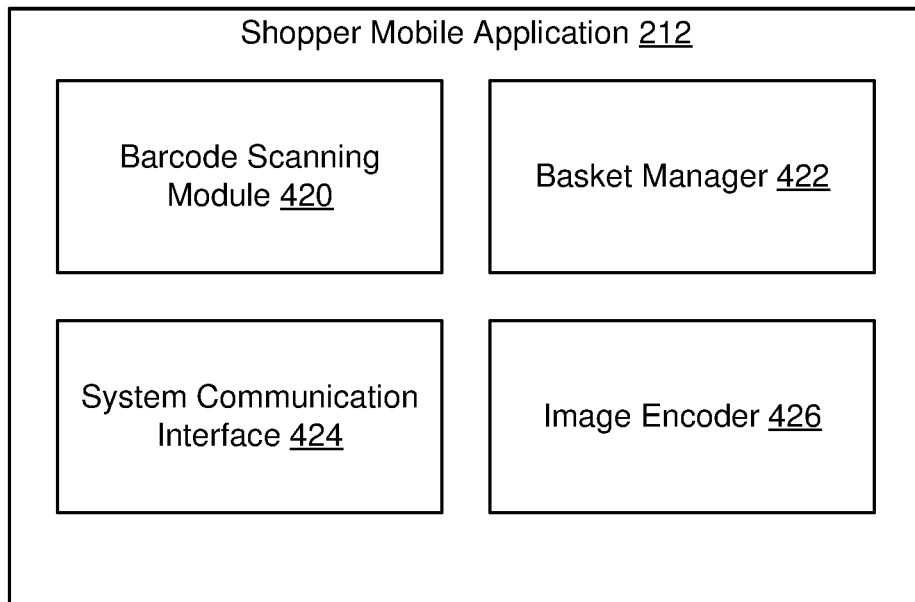
FIG. 4B is a diagram of a shopper mobile application (SMA), according to one embodiment.

FIG. 4B is a diagram of the shopper mobile application (SMA) 212, according to one embodiment. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

Generating Clusters of Stored Queries Based on Embeddings for Stored Queries

Figure 5:
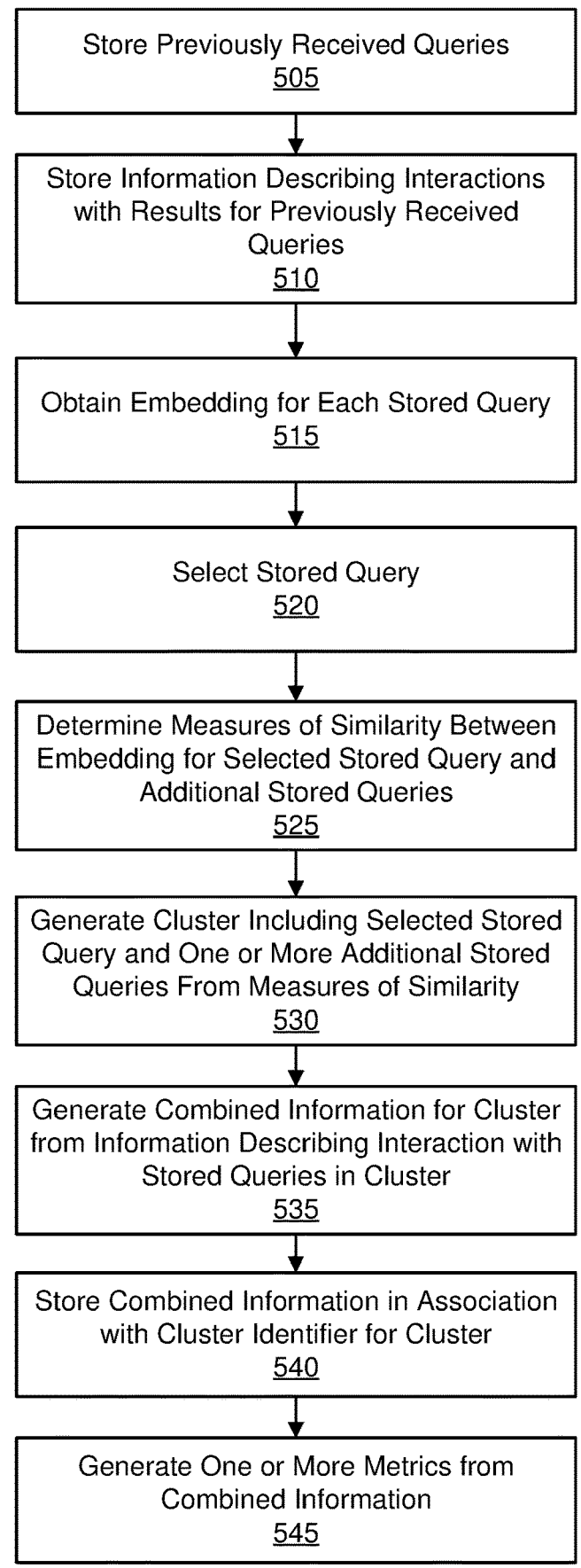
FIG. 5 is a flowchart of a method for combining stored information describing interactions with results of queries based on similarities between embeddings for different queries, according to one embodiment.

FIG. 5 is a flowchart of one embodiment of a method for combining stored information describing interactions with results of queries based on similarities between embeddings for different queries. In various embodiments, the method includes different or additional steps than those described in conjunction with FIG. 5. Further, in some embodiments, the steps of the method may be performed in different orders than the order described in conjunction with FIG. 5. The method described in conjunction with FIG. 5 may be carried out by the online concierge system 102 in various embodiments, while in other embodiments, the steps of the method are performed by any online system capable of retrieving items.

To simplify creation of an order by a user, when an online concierge system 102, or other online system, receives a request for an order from a user, the online concierge system 102 transmits an interface including a search interface. The online concierge system 102 receives queries comprising one or more terms from users via the search interface and returns results to a user based on the received query. For example, results returned to a user in response to a query include one or more items for which the online concierge system 102 maintains information that at least partially matches the query.

The online concierge system 102 stores 505 previously received queries and stores 510 information describing interactions by users with items displayed in response to received queries. In various embodiments, the online concierge system 102 stores 505 a previously received query and stores 510 information describing interactions by users with items displayed in response to the previously received query. The online concierge system 102 may analyze interactions by users with items displayed in response to received queries to determine how to subsequently display results for the query to maximize user interaction with those results.

Additionally, the online concierge system 102 obtains 515 an embedding for each previously received query that represents the query in a latent space. In some embodiments, the online concierge system 102 obtains 515 an embedding for each stored query. In various embodiments, when the online concierge system 102 receives a query, the online concierge system 102 applies one or more trained models to generate an embedding corresponding to the query from the terms included in the query. The online concierge system 102 stores the embedding in association with the received query, allowing the online concierge system 102 to generate embeddings from previously received queries. Example models for generating an embedding include a next token prediction model, a masked language model, a next sentence prediction model, a permutation language model, and a replaced token detection model; however, any suitable model may be applied to a suggestion to generate an embedding for the query.

To analyze interactions by users with a stored query, the online concierge system 102 selects 520 a stored query. In some embodiments, the online concierge system 102 ranks stored queries based on one or more criteria and selects 520 a stored query having at least a threshold position in the ranking. For example, the online concierge system 102 ranks stored queries based on amounts of interaction by users with items displayed as results to different stored queries (e.g., based on a click through rate for items displayed as results to different stored queries). However, the online concierge system 102 may use different criteria for selecting 520 a stored query in different embodiments.

From an embedding obtained 515 for the selected stored query and embeddings obtained 515 for additional stored queries, the online concierge system 102 determines 525 a measure of similarity between the embedding for the selected stored query and an embedding obtained 515 for each of one or more of the additional stored queries. In some embodiments, the measure of similarity between the embedding for the selected stored query and the embedding for an additional stored query is a distance between the embedding for the selected stored query and the embedding for the additional stored query in the latent space. Alternatively, the measure of similarity is a dot product or a cosine similarity between the embedding for the selected stored query and the embedding for the additional stored query.

From the measures of similarity between the embedding for the selected stored query and embeddings for additional stored queries, the online concierge system 102 generates 530 a cluster including the selected stored query and one or more additional stored queries. For example, the measure of similarity between the selected stored query and an additional stored query is a distance between the selected stored query and the additional stored query, so the online concierge system 102 generates 530 a cluster including additional stored queries having embeddings within a threshold distance in the latent space of the embedding for the selected stored query. In other embodiments, the online concierge system 102 ranks additional stored queries based on distances between embeddings for the additional stored queries and the embedding for the selected stored query and generates 530 the cluster including additional stored queries having at least a threshold position in the ranking. The online concierge system 102 may apply one or more nearest neighbor methods or approximate nearest neighbor methods to the embedding for the selected stored query and the embeddings for the additional stored queries to generate 530 the cluster. In other embodiments, the online concierge system 102 selects additional stored queries having embeddings with at least a threshold measure of similarity to the embedding for the selected stored query for inclusion in the cluster. As another example, the online concierge system 102 ranks additional stored queries based on measures of similarity between their embeddings and the embedding for the selected stored query and generates 530 the cluster to include additional stored queries having at least a threshold position in the ranking.

For each stored query in the cluster, the online concierge system 102 retrieves information describing interactions by users with items displayed in response to each stored query of the cluster that was stored 510 in association with a stored query of the cluster. From the information describing one or more interactions performed by users for each stored query included in the cluster, the online concierge system 102 generates 535 combined information for the cluster. The combined information for the cluster aggregates information describing stored interactions associated with each stored query of the cluster, allowing the online concierge system 102 to leverage stored interactions with multiple stored queries in the cluster. This increases an amount of prior interactions with queries that the online concierge system 102 can analyze, improving subsequent analysis of user interaction with queries by accounting for interactions with other, similar queries.

The online concierge system 102 stores 540 the combined information in association with a cluster identifier that uniquely identifies the cluster. In some embodiments, after storing 540 the combined information in association with the cluster, the online concierge system 102 removes stored information describing one or more interactions with displayed results for stored queries that are included in the cluster. This allows the online concierge system 102 to more efficiently allocate storage resources by consolidating information describing one or more interactions with queries included in a cluster rather than maintaining separate information for each query included in the cluster.

In various embodiments, a representative query selected from the stored queries included in the cluster is also stored in association with the combined information. For example, the representative query for the cluster is a stored query included in the cluster associated with stored information indicating a maximum amount of interaction with results displayed in response to the stored query. As another example, the representative query for the cluster is a stored query included in the cluster for which the online concierge system 102 has stored 510 a maximum amount of information describing one or more prior interactions with results presented in response to the stored query. However, the online concierge system 102 may select the representative query from the stored queries included in cluster using other criteria in other embodiments.

The online concierge system 102 may generate a cluster embedding for the cluster and store the cluster embedding in association with the cluster identifier. For example, the online concierge system 102 may generate the cluster embedding as a centroid of the embeddings for the stored queries included in the cluster. In some embodiments, the online concierge system 102 may weight embeddings for different stored queries included in the cluster based on one or more criteria, such as numbers of one or more interactions with results displayed in response to a query of the cluster. The cluster embedding may be stored in association with the cluster identifier and the combined information in various embodiments.

From the combined information stored 540 in association with the cluster, the online concierge system 102 generates 545 one or more metrics describing prior user interactions with stored queries included in the cluster. In various embodiments, a generated metric describes prior user interactions with an item displayed after receiving a stored query included in the cluster. For example, the online concierge system 102 generates 545 a combined rate of interaction for an item displayed in response to a stored query included in the cluster by determining a ratio of a combined number of occurrences of a particular interaction with display of the item after receiving each stored query included in the cluster to a combined number of impressions of results displaying the item in response to each stored query included in the cluster. In another example, the online concierge system 102 generates 545 the combined rate of interaction for the item as a ratio of a combined number of occurrences of a particular interaction with display of the item after receiving each stored query included in the cluster to a sum of the combined number of impressions of results displaying the item in response to each stored query included in the cluster and a constant. Adding the constant to the combined number of impressions of the item allows the online concierge system 102 to offset a lower number of impressions of the item in response to previously received search queries when determining the combined rate of interaction with the item in results displayed for search queries In other embodiments, the combined rate of interaction for the item accounts for positions in an interface in which the item is displayed in results, or a position of the item in results, responsive to receipt of stored queries included in the cluster. For example, the online concierge system 102 applies a position discount to display of the item in search results responsive to stored queries in the cluster and determines a weighted combination of numbers of times the item was displayed in different positions weighted by the corresponding position discount. The online concierge system 102 generates the combined rate of interaction for the item as a ratio of a number of specific interactions with the item to the weighted combination. In various embodiments, the online concierge system 100 determines the position discount for display of the item in results responsive to a query included in the cluster using different methods.

In various embodiments, the online concierge system 102 modifies subsequent display of items in response to receiving a query included in the cluster. For example, the online concierge system 102 modifies positions of one or more items in results that are responsive to the query based on the metrics generated for the one or more items. This allows the online concierge system 102 to modify results for the query so items with higher amounts of user interaction specified by the one or more metrics are more visible or easily accessible in the results, decreasing an amount of user interaction with an interface to identify one or more items in the results. As the one or more metrics accounts for combined interactions by users to results to similar queries, modifying the displayed results based on the one or more metrics to more accurately account for user interaction with items when displaying or when ordering results to a query.

Figure 6:
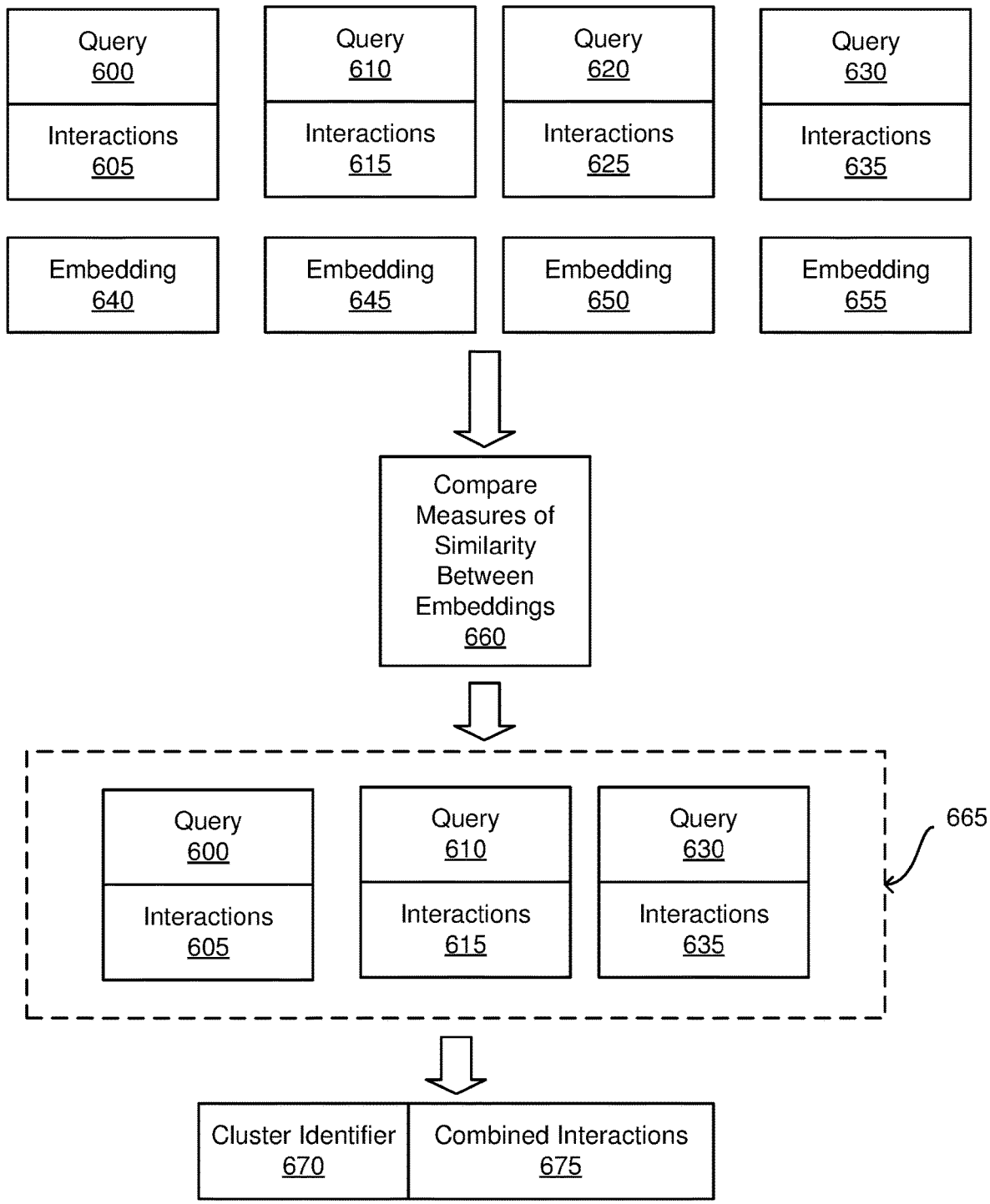
FIG. 6 is a process flow diagram of a method for combining stored information describing interactions with results of queries based on similarities between embeddings for different queries, according to one embodiment.

FIG. 6 is a process flow diagram of one embodiment of a method for combining stored information describing interactions with results of queries based on similarities between embeddings for different queries. In the example of FIG. 6, an online concierge system 102 stores query 600 in association with information describing interactions 605 by items included in results for query 600. Query 610 is stored in association with information describing interactions 615 by users with items included in results for query 615. Similarly, query 620 is stored in association with information describing user interactions 625 with items included in results for query 620. And query 630 is stored in association with information describing interactions 635 by users with items included in results for query 630.

As further described above in conjunction with FIG. 5, the online concierge system 102 obtains embeddings for each stored query. In the example of FIG. 6, embedding 640 is for query 600 and embedding 645 is for query 610. Similarly, embedding 650 represents query 620, and embedding 655 represents query 630.

The online concierge system 102 selects a query, as further described above in conjunction with FIG. 5. For purposes of illustration, FIG. 6 depicts selection of query 600 by the online concierge system 102. As further described above in conjunction with FIG. 5, the online concierge system 102 compares 600 measures of similarity between embedding 640, corresponding to query 600, and each of embedding 645, embedding 650, and embedding 655. A measure of similarity may be a cosine similarity or a dot product between embeddings. In other embodiments, the measure of similarity is a distance between embeddings in a latent space.

Based on the measures of similarity, the online concierge system 102 generates cluster 665. The cluster 665 includes queries in addition to query 600, the selected query, based on measures of similarity between embedding 640 for query 600 and each of embedding 645, embedding 650, and embedding 655. In various embodiments, the cluster 665 includes queries having corresponding embeddings with at least at threshold measure of similarity to embedding 640 for query 600 or having corresponding embeddings having at least a threshold position in a ranking based on measure of similarity to embedding 640 for query 600. In the example of FIG. 6, embedding 645 and embedding 655 have measures of similarity to embedding 640 that satisfy criteria for inclusion in the cluster 665. Hence, cluster 665 includes query 600, the selected query, as well as query 610 and query 630, which correspond to embedding 645 and embedding 655, respectively. The online concierge system 102 generates cluster identifier 670, which uniquely identifies cluster 665.

As further described above in conjunction with FIG. 5, the online concierge system 102 generates combined interactions 675 for the cluster 665 based on the interactions stored in association with each query included in the cluster 665. In the example of FIG. 6, combined interactions 675 aggregates information describing interactions 605 by items included in results for query 600, information describing interactions 615 by users with items included in results for query 610, and information describing interactions 635 by users with items included in results for query 630. The online concierge system 102 stores the combined interactions 675 in association with cluster identifier 670, simplifying subsequent retrieval and use of combined interactions 675 to analyze one or more of query 600, query 610, and query 630, as further described above in conjunction with FIG. 5.

In one embodiment, the search queries are clustered into static sets of clusters, where the queries are assigned to one or more clusters based on the proximity of their embeddings (using, e.g., disjoint or k-means clustering). As such, the clusters do not change based on a particular user query that is being evaluated. This beneficially saves computing resources, as fewer clusters need to be stored, and the static clusters can be pre-computed to reduce latency. The queries may be assigned to only one cluster, such that there is no overlap in which the same search query is in multiple clusters. Alternatively, queries may be assigned to multiple clusters.

In another embodiment, the search queries are dynamically clustered for a specific query. For example, if a user inputs a new query, the system may generate a cluster specifically for that query, rather than retrieve a cluster for which a query has been pre-assigned. In this sense, the clusters are generated dynamically, since the membership of a cluster depends on a seed query for which the cluster is being generated. Unlike static clustering, the clusters generated using this dynamic clustering approach may not be consistent across queries. For example, the nearest neighbors for query q1 may be queries q2 and q3, while the nearest neighbors for query q2 may be q1 and q4, but not q3. With dynamic clustering, the specific query for which the cluster is generated is the centroid for selecting nearest neighbors, so the resulting cluster may be more relevant to the specific query. Dynamically generated clusters may still be precomputed offline or generated as the cluster is needed. Precomputing the clusters may reduce latency, whereas generating them as needed (e.g., at inference time) may reduce the memory required to store all of the clusters.

To generate a cluster for a specific query, the system may obtain the embedding for the specific query and then use an approximate nearest neighbor (ANN) algorithm to identify a group of other embeddings that are similar to the embedding for the specific query. The measure of similarity for embeddings may be based on cosine similarity, dot products, or any other suitable similarity measure. Once the dynamic cluster is generated, the interaction information (e.g., click-through rate, CTR) for each of the queries in the cluster is combined and then used for the specific query. As noted, each query may have a different cluster, so queries that are in each other's cluster may still have different combined interaction information.

In various embodiments, the clusters are computed for a specific query, and the interaction information for each query in the cluster is combined for that specific query. This combining can be performed offline, e.g., by computing the interaction information for each query in the cluster and saving the combined interaction information in a lookup table associated with the specific query. Alternatively, the combining step can be performed online by retrieving the interaction information of the other queries in the cluster and computing the combination when the interaction information for the specific query is needed.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. In some embodiments, the computer-readable medium is a non-transitory computer readable storage medium that includes optical memory devices (e.g., CD, DVD, HD-DVD, Blu-ray Disc, etc.), semiconductor memory devices (e.g., RAM, EPROM, EEPROM, etc.), magnetic memory devices (e.g., hard disk drive, floppy disk drive, tape drive, MRAM, etc.) or any hardware storage memory and does not include electromagnetic signals or carrier waves.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, performed at an online concierge system comprising at least one processor and memory:
   storing a plurality of queries including one or more terms;
   storing interaction information for each stored query of the plurality of queries, wherein the interaction information describes one or more interactions performed by one or more users after the online concierge system received the corresponding query of the plurality of queries;
   generating an embedding for each stored query of the plurality of queries, wherein each embedding represents the corresponding stored query in a latent space;
   selecting a first stored query of the plurality of queries;
   determining a measure of similarity between an embedding for the first stored query and a plurality of embeddings for a plurality of additional stored queries, wherein the measure of similarity is determined by comparing the embedding for the first stored query and the vector of the embedding for one of the plurality of additional stored queries in the latent space;
   generating a cluster including the first stored query and one or more of the plurality of additional stored queries having embeddings with at least a threshold measure of similarity to the first stored query;
   combining the interaction information for each of the stored queries included in the cluster;
   storing the combined interaction information in association with a cluster identifier uniquely identifying the cluster;
   generating one or more metrics describing the combined interaction information with stored queries in the cluster; and
   in response to receiving a query associated with the cluster, displaying a result for the query comprising: modifying positions of one or more items in the result displayed in a user interface based on the one or more metrics of the combined interaction information.

2. The method of claim 1, wherein storing the combined information in association with a cluster identifier uniquely identifying the cluster comprises:
   selecting a representative query for the cluster from the corresponding stored queries included in the cluster; and
   storing the representative query in association with the cluster identifier and with the combined interaction information.

3. The method of claim 2, wherein storing the combined interaction information in association with a cluster identifier uniquely identifying the cluster further comprises:

generating a cluster embedding for the cluster from embeddings for each stored query included in the cluster; and storing the cluster embedding in association with the cluster identifier.

4. The method of claim 3, wherein generating the cluster embedding comprises calculating a centroid of the embeddings for the stored queries included in the cluster.

5. The method of claim 1, further comprising:
removing the interaction information for each of the stored queries included in the cluster in response to storing the combined interaction information.

6. The method of claim 1, wherein generating the cluster including the first stored query and one or more additional stored queries having embeddings with at least a threshold measure of similarity to the first stored query comprises:
generating the cluster based on distances between the embedding for the first stored query and embeddings for additional stored queries in a latent space.

7. The method of claim 6, wherein generating the cluster based on distances between the embedding for the first stored query and embeddings for additional stored queries in the latent space comprises:
selecting additional stored queries for the cluster by applying one or more approximate nearest neighbor methods to the embedding for the first stored query and embeddings for additional stored queries.

8. The method of claim 1, further comprising:
receiving a new query;
retrieving one or more items matching the new query;
associating the new query to the cluster; and
generating a metric for each of the one or more items matching the query, wherein the metric for each of the one or more items is generated based on the combined interaction information associated with the cluster identifier for the cluster.

9. The method of claim 8, wherein the metric for each of the one or more items is based on a number of occurrences of a specific interaction with the item when displayed in results for each stored query included in the cluster and a number of times the item was displayed in results for each stored query included in the cluster.

10. A computer program product comprising a non-transitory computer readable storage medium having instructions encoded thereon that, when executed by a processor, cause the processor to:
store a plurality of queries including one or more terms;
store interaction information for each stored query of the plurality of queries, wherein the interaction information describes one or more interactions performed by one or more users after receiving the corresponding query of the plurality of queries;
generate an embedding for each stored query of the plurality of queries, wherein each embedding represents the corresponding stored query in a latent space;
select a first stored query of the plurality of queries;
determine a measure of similarity between an embedding for the first stored query and a plurality of embeddings for a plurality of additional stored queries, wherein the measure of similarity is determined by comparing the embedding for the first stored query and the embedding for one of the plurality of additional stored queries in the latent space;
generate a cluster including the first stored query and one or more of the plurality of additional stored queries having embeddings with at least a threshold measure of similarity to the first stored query;

combine the interaction information for each of the stored queries included in the cluster;
store the combined interaction information in association with a cluster identifier uniquely identifying the cluster;
generate one or more metrics describing the combined interaction information with stored queries in the cluster; and
in response to receiving a query associated with the cluster, display a result for the query comprising: modifying positions of one or more items in the result displayed in a user interface based on the one or more metrics of the combined interaction information.

11. The computer program product of claim 10, wherein the instructions to store the combined information in association with a cluster identifier uniquely identifying the cluster, when executed by a processor, cause the processor to:
select a representative query for the cluster from the corresponding stored queries included in the cluster; and
store the representative query in association with the cluster identifier and with the combined interaction information.

12. The computer program product of claim 11, wherein the instructions to store the combined interaction information in association with a cluster identifier uniquely identifying the cluster, when executed by a processor, cause the processor to:
generate a cluster embedding for the cluster from embeddings for each stored query included in the cluster; and
store the cluster embedding in association with the cluster identifier.

13. The computer program product of claim 12, wherein the instructions to generate the cluster embedding, when executed by a processor, cause the processor to: calculate a centroid of the embeddings for the stored queries included in the cluster.

14. The computer program product of claim 10, wherein the non-transitory computer readable storage medium further has instructions encoded thereon that, when executed by the processor, cause the processor to:
remove the interaction information for each of the stored queries included in the cluster in response to storing the combined interaction information.

15. The computer program product of claim 10, wherein the instructions to generate the cluster including the first stored query and one or more additional stored queries having embeddings with at least a threshold measure of similarity to the first stored query, when executed by a processor, cause the processor to:
generate the cluster based on distances between the embedding for the first stored query and embeddings for additional stored queries in a latent space.

16. The computer program product of claim 15, wherein the instructions to generate the cluster based on distances between the embedding for the first stored query and embeddings for additional stored queries in the latent space, when executed by a processor, cause the processor to:
select additional stored queries for the cluster by applying one or more approximate nearest neighbor methods to the embedding for the first stored query and embeddings for additional stored queries.

17. The computer program product of claim 10, wherein the non-transitory computer readable storage medium further has instructions encoded thereon that, when executed by the processor, cause the processor to:
receive a new query;

retrieve one or more items matching the new query;
associate the new query to the cluster; and
generate a metric for each of the one or more items matching the query, wherein the metric for each of the one or more items is generated based on the combined interaction information associated with the cluster identifier for the cluster.

18. The computer program product of claim 17, wherein the metric for each of the one or more items is based on a number of occurrences of a specific interaction with the item when displayed in results for each stored query included in the cluster and a number of times the item was displayed in results for each stored query included in the cluster.

19. A system comprising:
a processor; and
a non-transitory computer readable storage medium having instructions encoded thereon that, when executed by the processor, cause the system to:
store a plurality of queries including one or more terms;
store interaction information for each stored query of the plurality of queries, wherein the interaction information describes one or more interactions performed by one or more users after the system received the corresponding query of the plurality of queries;
generate an embedding for each stored query of the plurality of queries,
wherein each embedding represents the corresponding stored query in a latent space;
select a first stored query of the plurality of queries;
determine a measure of similarity between an embedding for the first stored query and a plurality of embeddings for a plurality of additional stored queries, wherein the measure of similarity is determined by comparing the embedding for the first stored query and the embedding for one of the plurality of additional stored queries in the latent space;
generate a cluster including the first stored query and one or more of the plurality of additional stored queries having embeddings with at least a threshold measure of similarity to the first stored query;
combine the interaction information for each of the stored queries included in the cluster;
store the combined interaction information in association with a cluster identifier uniquely identifying the cluster;
generate one or more metrics describing the combined interaction information with stored queries in the cluster; and
in response to receiving a query associated with the cluster, display a result for the query comprising: modifying positions of one or more items in the result displayed in a user interface based on the one or more metrics of the combined interaction information.

\* \* \* \* \*